United States Patent [19]

Fee, Jr.

[11] 3,864,515

[45] Feb. 4, 1975

[54] WRITING MACHINE ASSEMBLY FOR PRODUCING REDUCED GRAPHIC CHARACTERS CORRESPONDING TO GROSS MOVEMENTS OF A WRITER'S ARM

[76] Inventor: James W. Fee, Jr., 16 Cottage Ave., Bay Shore, N.Y. 11706

[22] Filed: Sept. 24, 1973

[21] Appl. No.: 399,958

[52] U.S. Cl. .................... 178/18
[51] Int. Cl. .................... G08c 21/00
[58] Field of Search .................... 178/87, 18, 19, 20; 346/139 R, 139 C; 340/146.3 SY

[56] References Cited

UNITED STATES PATENTS

| | | | |
|---|---|---|---|
| 909,421 | 1/1909 | Jenkins | 178/20 |
| 1,129,317 | 2/1915 | Tiffany | 178/20 |
| 2,446,392 | 8/1948 | Rey | 178/19 |
| 2,566,546 | 9/1951 | Barnes, Jr. et al. | 178/18 |
| 2,618,704 | 11/1952 | Ress | 178/18 |
| 2,998,482 | 8/1961 | Anthony | 178/18 |
| 3,462,548 | 8/1969 | Rinder | 178/18 |

*Primary Examiner*—Thomas A. Robinson
*Attorney, Agent, or Firm*—Edward H. Loveman

[57] ABSTRACT

A writing machine assembly has an axially movable joy stick carried by gimbals suspended from an elevated support. Potentiometers mechanically coupled to the gimbals vary in resistance as the joy stick is moved. The potentiometers are electrically connected to a pen drive means in a graphic recorder for writing graphic characters corresponding to movements of a free end of the joy stick in a horizontal plane. The support carries a first index switch actuated by the joy stick when raised and connected in circuit to the pen drive means to advance the pen along a line of writing a step at a time. A contact located in a plate under the joy stick is connected in series with the joy stick to a remote pen lift control means for lifting and lowering the pen when the joy stick respectively contacts the plate and is lifted therefrom. The support carries another index switch connected in circuit with a stepping switch and a voltage divider for stepping the pen from one line of writing to the next. Two reset switches carried by the support reset the pen to the start of the line of writing and to the first line of writing. A telephone dial switch connected in parallel with the first index switch enables stepping the pen any desired number of spaces along the line of writing.

7 Claims, 8 Drawing Figures

$$m\frac{d^2x}{dt^2} = c\frac{dx}{dt} + Kx - F$$

$$W = \int_b^a F \cdot dt$$

$$m\frac{d^2x}{dt^2} = c\frac{dx}{dt} + Kx - F$$

$$W = \int_b^\alpha F \cdot dt$$

WRITING MACHINE ASSEMBLY FOR PRODUCING REDUCED GRAPHIC CHARACTERS CORRESPONDING TO GROSS MOVEMENTS OF A WRITER'S ARM

This invention concerns a writing machine assembly, wherein a gross arm motion outlining a character is converted to a corresponding graphic character of reduced size.

The present invention has arisen out of the need of handicapped persons, particularly those suffering from a loss of coordination in their arms who have difficulty in writing legibly. This condition is a somewhat common characteristic of cerebral palsy and causes two problems, one of which is the inability to execute small intricate motions accurately and the other being what is medically known as tremor, or an involuntary shaking. Both of these problems make it impossible for one to write anything legible on a small scale, and make anything legibly written on a large scale rather unpleasing to the eye from a penmanship standpoint. However if the grossly written characters are reproduced on a small scale, the reduced characters retain legibility and their appearance is improved. Also there is a considerable saving in paper, since the reproduced copy occupies much less space than grossly written copy.

According to the invention, there is provided a writing machine assembly comprising an elevated platform supporting a set of gimbals of the type employed in an electric gyroscope. The axles of the gimbals are mutually perpendicular and are connected mechanically to the wipers of two rotary potentiometers. The gimbals are supported by the elevated platform over a writing surface and carry an axially vertical joy stick arranged for slight axial motion. The bottom free end of the joy stick is capable of movement through a path of 360° in the horizontal plane of the writing surface while the gimbals rotate on their mutually perpendicular axles. The writing surface comprises a flat metal plate supported in a horizontal stationary position under the joy stick. By the arrangement described all motions of the joy stick in the horizontal plane of the writing surface are converted to corresponding changes in electrical resistance of the potentiometers.

The assembly includes a conventional Mosley type of X-Y recorder which includes a pen mounted on and movable over a recording table on which recording paper is placed. The pen may be lifted from the paper and lowered thereon by electromagnetic means which are responsive to remote signals. The recorder is responsive to applied signals of varying amplitudes to move the pen in mutually perpendicular directions on the writing table for producing corresponding graphic characters.

In operation of the system, a person grasps the joy stick in one hand, lowers it to the metal plate and steadies his hand on the plate, which minimizes hand tremors. Then the person moves his arm to outline a large character symbol, which can be a letter, number, etc., on the metal plate. A corresponding reduced, legible character is graphically produced at the recorder. The recorder pen indexes laterally from space to space, indexes downwardly from line to line, in both directions, and resets as fast as the operator can lift the joy stick and can operate the reset switches.

A principal object of the present invention is to provide a writing machine assembly especially useful to handicapped persons for producing legible graphic copy.

Another object of the present invention is to provide a writing machine assembly which makes it possible for a person having some reasonable control of arm motion on a gross scale to produce legible graphic characters of small size.

Still another object of the present invention is to provide a writing machine assembly having means for reducing arm motion on a gross scale to electrical signals indicative of a legible graphic character.

These and other objects and many of the attendant advantages of this invention will be readily appreciated as the same becomes better understood by reference to the following detailed description when considered in connection with the accompanying drawings in which.

Figure 1:
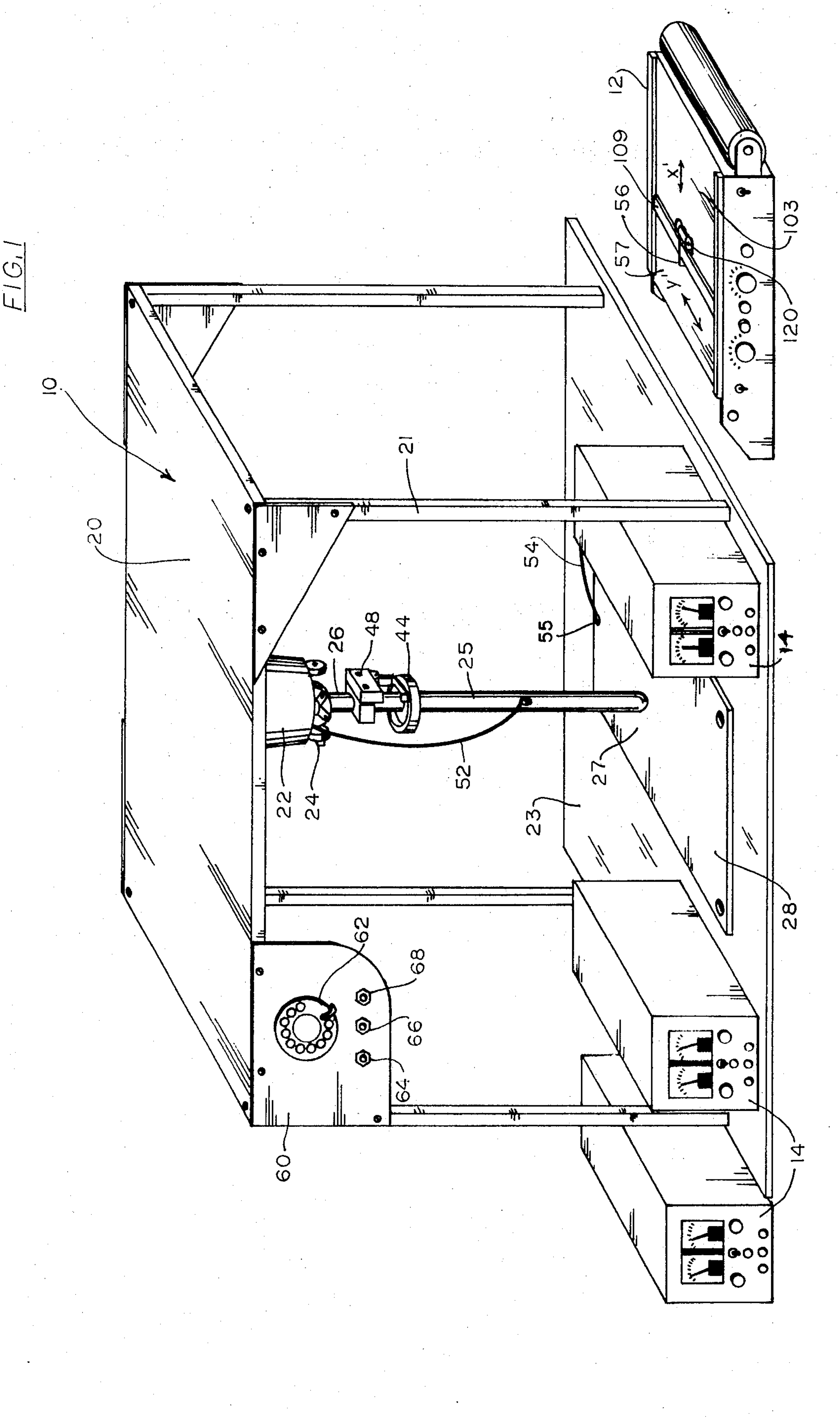
FIG. 1 is a perspective view of a writing machine assembly embodying the present invention.
Figures 2, 3, 4:
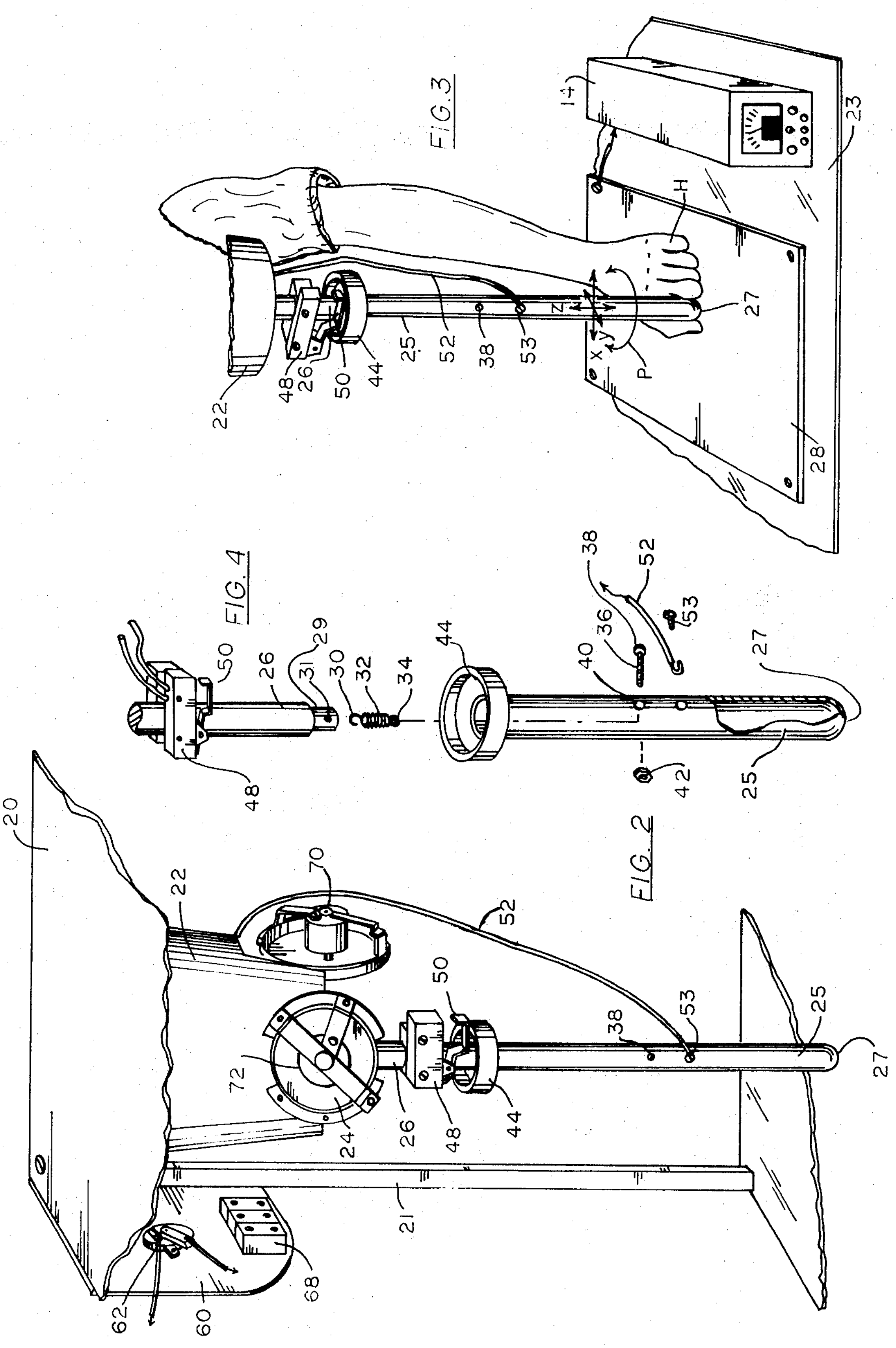
FIG. 2 is an enlarged perspective view of parts of the writing mechanism.
FIG. 3 is a front perspective view of a portion of the writing mechanism showing a user's arm and a joy stick in a writing position.
FIG. 4 is an exploded perspective view of parts of the joy stick.

Referring now to the drawings wherein like reference characters designate like or corresponding parts throughout, there is shown in FIG. 1 a writing machine assembly which includes a writing mechanism 10, a chart recorder 12 and a power supply 14. The writing mechanism 10 includes a horizontal rectangular plate or platform 20 provided with four vertical legs 21 at corners thereof to support the platform 20 a fixed distance above a horizontal table or desk 23 which serves as a support for the entire assembly. Secured to the underside of the platform 20 and depending therefrom is a gimbal assembly 22 having two gimbals 24 supporting a vertical post or rod 26, see FIGS. 1–4. The rod 26 carries a tubular metal joy stick 25 which serves as a writing instrument. The gimbals are axially oriented 90° to permit the rod 26 to tilt on mutually perpendicular horizontal axes, so that the rod 26 and the joy stick 25 are movable in either direction through a path P of 360° as indicated in FIG. 3. The bottom end 27 of the axially vertical joy stick 25 is rounded and normally held a short distance above a horizontal metal plate 28 disposed under the platform 20.

The joy stick 25 may be moved up and down axially a short distance in direction Z; see FIG. 3. To accomplish this, the tubular joy stick 25 is fitted axially on the rod 26 which extends axially into the joy stick 25. At the lower end of the rod 26 is a stud 29 provided with a hole 31 which engages an upper loop 30 of a coil spring 32; (FIG. 4). A lower loop 34 of the spring 32 is engaged on a shank 36 of a machine screw 38 inserted through diametrically aligned holes 40 formed in the joy stick 25 and secured by a nut 42. At the upper end of the joy stick 25 is an annular flange 44. The rod 26 carries a switch 48 having an operating switch arm 50 which may be contacted by the flange 44 and moved upwardly to close the switch 48 when the joy stick 25 is raised axially. The joy stick 25 may be lowered axially to touch the metal plate 28. A pair of circuit wires 52 and 54 are connected by respective screws 53 and 55 to a side of the joy stick 25 and one corner of the metal plate 28 respectively. These wires are connected in the recorder circuit of FIG. 6 and provide a signal for lowering and lifting a pen 56 when the joy stick 25 is lowered and raised respectively. The joy stick 25 normally floats in an intermediate position held by the spring 32 which is partially extended. Thus the bottom end 27 of the joy stick 25 is normally spaced slightly above the plate 28 while upper ring 44 is spaced slightly below switch arm 50.

FIG. 3 shows how a person can grasp the lower end of the joy stick 25 and move it in the X-Y plane of the plate 28 to simulate the writing of a character thereon. The joy stick 25 may be moved down to ride on the plate 28 while this writing movement is executed. The writer stabilizes his writing hand H on the plate 28 to minimize tremors. When the motion outlining the desired character is completed, the writer raises the joy stick 25 to actuate the switch 48 for indexing the pen 56 of the recorder 12 one step to the right in the X' or transverse writing direction on a paper 57 in the recorder 12. The platform 20 carries a vertical panel 60 on which is a telephone switching dial 62 and three pushbutton switches 64, 66 and 68. The telephone dial 62 and the switches 64, 66 and 68 are connected in a circuit 100 illustrated in FIG. 5 and described below. The switch 48 is connected in the circuit 100. Two of the gimbals 24 are spaced 90° apart and are connected to respective wipers of potentiometers 70, 72 connected in the circuit 100. These potentiometers have stationary resistance rings along which contact arms are movable when the rod 26 tilts in X and Y directions respectively to vary the electrical resistances which the potentiometers 70 and 72 apply to the circuit 100.

Figure 5:
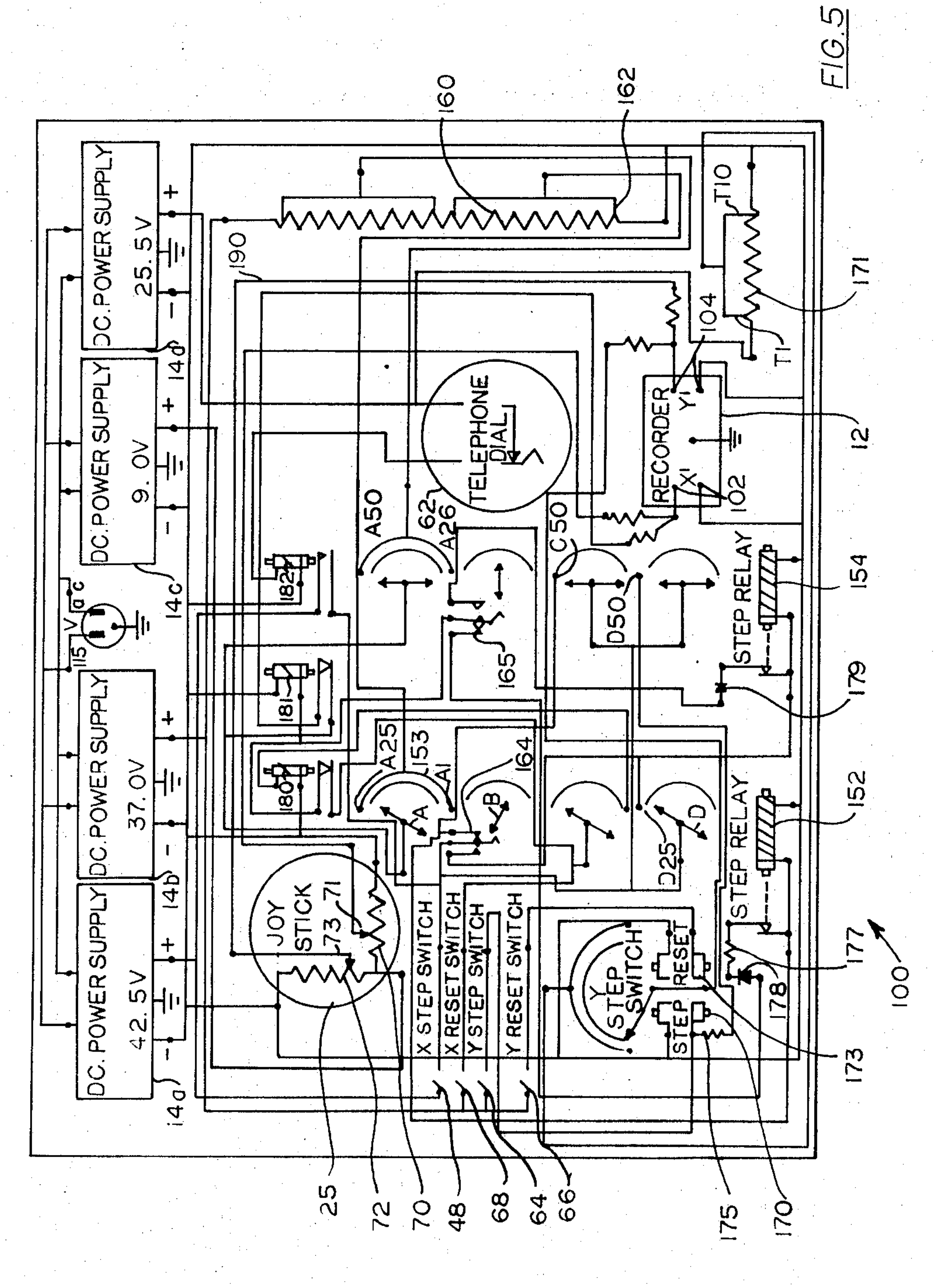
FIG. 5 is a diagram of an electrical circuit of the writing machine assembly.
Figures 6, 7, 8:
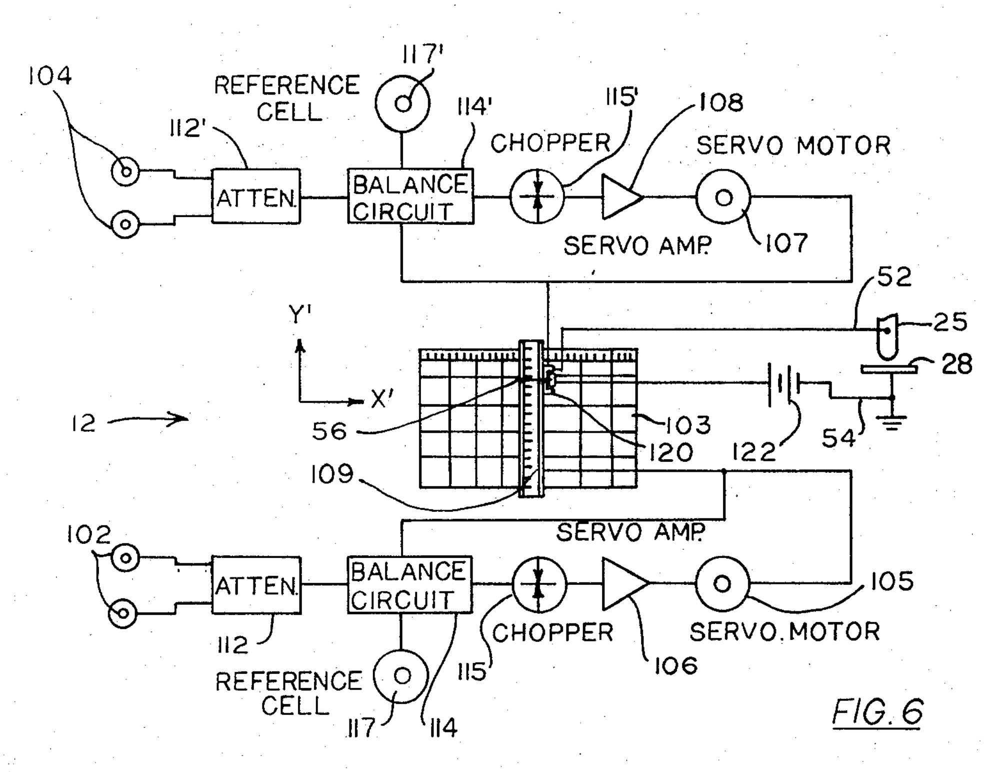
FIG. 6 is a diagram of a recorder forming part of the assembly.
FIG. 7 is a graphic sample of writing by a handicapped writer without the writing machine assembly.
FIG. 8 is a graphic sample of writing, similar to FIG. 7, with the aid of the writing machine assembly.

Referring now to FIGS. 5 and 6, the circuit 100 includes the joy stick 25 mechanically connected via the gimbals 24 to wipers 71 and 73 of the potentiometers 70 and 72 respectively. By this arrangement mechanical movements of the joy stick 25 by a writer's arm are converted into electrical signals which constitute input signals to the circuit 100.

Output signals from the potentiometers 70, 72 are applied to a pair of X and Y input terminals 102, 104 of a standard Mosely type of X-Y chart recorder 12 shown in FIG. 1 and shown diagrammatically in FIG. 6. The recorder 12 has a table 103 on which a sheet of paper may be held stationary while the pen 56 on a carriage 109 is moved in X' and Y' directions to trace out characters corresponding to movements of the joy stick 25. The pen 56 moves in response to the magntiude of voltage applied to a pair of servomotors 105 and 107 which respectively drive the carriage 109 in the X' direction, and a pen advance mechanism (not shown) in the Y' direction. A pair of amplifiers 106 and 108 respectively drive the servomotors 105 and 107. Output signals from the potentiometers 70, 72 in the circuit 100 are applied to the respective recorder terminals 102, 104 and are transmitted to the respective servomotors 105, 107 via a pair of respective attenuators 112, 112', a pair of respective balance circuits 114, 114', a pair of respective choppers 115, 115' and the respective amplifiers 106, 108. A pair of reference cells 117, 117' are respectively connected to the balance circuits 114 and 114'. The recorder 12 has remote pen lift control means including a solenoid 120 to which the metal joy stick 25 and the plate 28 are connected in series, along with an internal voltage supply 122. When the joy stick 25 is lowered to contact the plate 28 to trace out a character, the pen 56 is lowered onto the paper 57 on the table 103. When the joy stick 25 is raised from the plate 28, the pen 56 is automatically lifted from the paper 57. The amplifiers 106, 108 have eight different selective amplification values, namely: 0.1, 0.2, 0.5, 1.0, 5.0, 10.0, 20.0 and 50.0. These are stated in millivolts per inch movement of the pen 56. With this range of values, the input voltage to the potentiometers 70 and 72 of the joy stick 25 may be varied so that one has the option of nine different factors of amplification for reduction of input character size. In addition, by varying the voltage across the potentiometers 70 and 72, an infinite number of reduction ratios may be achieved.

The system is arranged so that one writes only one letter at a time. Then the pen 56 is indexed to a new position. The recorder 12 operates on the principle that the position of the pen 56 is a function of the input voltage. By varying input voltages the position of the pen in X' and Y' directions on the table 103 is accomplished. The different voltages required for operation of the circuit 100 are supplied by four different power supplies 14*a*–14d.

For indexing in the X' direction, i.e. transversely across the table 103, there are provided two 25 position conventional Strowger type relays 152, 154. The switch 48 is connected across the stepping relays 152, 154 so that the relays can be stepped one step at a time. The stepping relays 152, 154 are arranged in circuit 100 in such a way that the two together operated successively produce 50 steps in the X' direction of the carriage 103 in the recorder 12. A voltage divider 160 is used to produce 50 voltage steps. The voltage divider 160 includes 50 resistors all of the same resistance value connected in series. A tap 162 is placed at each end of the string and on each junction of the 50 resistors. These taps are connected to the 50 taps on the stepping relays 152, 154. In order to provide an option of indexing over a number of spaces, a 10-step telephone dial 62 is connected in parallel with the switch 48. A single pole-double throw pole switch 164 is flipped automatically when a first stepping switch 152 reaches position A25, so that both stepping relays 152, 154 are controlled alternatively by one switch 48 and by the telephone dial 62 since the telephone dial 62 and the switch 48 are connected in parallel. In the reset circuit of the relays 152, 154, there is provided an automatically operated single pole-double throw switch 165 which accomplishes automatic transfer of resetting from one stepping relay to the other. The manually operated switch 68 on the panel 60 is connected in a reset circuit which resets the relays 152, 154 and effects resetting of the position of the carriage 109 to the beginning position at the left end of a line in direction X' on the table 103.

Damping of tremors and erratic arm and finger movements is accomplished by provision of the plate 28 on which the writer rests his hand as shown in FIG. 3. The spring 32 shown in FIG. 4 allows movement of the joy stick 25 up and down. When the joy stick 25 moves down to contact the plate 28, a solenoid 120 is actuated to move the pen 46 down. When the joy stick 25 is moved up to separate from the plate 28, the solenoid 120 is deactivated and a spring (not shown) lifts the pen 56. When the joy stick 25 is moved to its upper limit after completing the writing of a character on the plate 28, the switch 48 is closed to effect indexing of the pen 56 in the X' direction.

Indexing in the Y' direction for moving the pen 56 downward from one line to the next on the table 103, is accomplished by means of a 10-position Strowger type of relay 170. Connected to the relay 170 are manually operated switches 64 and 66 located on the panel 60. The switch 64 serves to step the relay 170 from one tap to the next on a resistor 171 which has 10 taps. This applies one of ten different voltages to the recorder input terminals 104 so that the pen 56 moves along the table 103 line by line. The switch 66 actuates a solenoid 173 to reset the relay 170 so that the pen 56 moves upwardly and returns to the topmost line on the table 103. The rotary potentiometer 72 serves as a voltage divider to effect application of varying voltages to the pen drive mechanism and thus accomplishes movement of the pen 56 in the Y' direction in writing a character.

Certain automatic operational features of the system will now be described. Start by assuming that one is writing on a new page starting at the top left hand corner. At the starting time, the Stowger relays 152, 154 and 170 are on position "1". We imagine writing letters by use of the joy stick 25 and manually raising the joy stick 25 to close the X-step switch 48 after each letter is written. This fires the coil of the first stepping relay 152. The pole A of step relay 152 will progress around the first 25 contacts A1–A25. When contact A25 is reached, contact D25 connects X-step switch 48 to the second step relay 154. On the next closing of switch 48, both relays fire and the first step relay 152 moves to neutral position, while the second realy 154 moves to the 26 position. Thus there is a smooth change-over from one relay to the other. When the first step relay 152 reaches the neutral position, a finger on pole B moves single pole-double throw switch 164 from one contact to the other. This disconnects the X-step switch 48 from the first relay 152 and connects it to the second relay 154, and pole D of the second step relay then proceeds around the next 25 contacts. When the 50th contact is reached, the X-step switch 48 is connected to the first step relay 152 by a contact C50 and to the Y-step switch 64 by a contact D50. When the X-step switch 48 is again closed all three relays 152, 154, 170 fire and the pen 56 moves to the beginning of the next line. A resistance 175 in the circuit from the contact D50 to the step relay 170 is provided to insure that all three relays fire at the same time. The step relay 170 steps from a positive end T1 of a bank of resistors 171 to a negative end T10. This is due to the fact that the Y-step switch 64 steps the pen 56 down the page, and for this more and more negative voltage is required.

It will be noted in the reset circuit, that the two X stepping relays 152, 154 follow after each other until they both return to positions A1, A26. A resistor 177 in this circuit serves to slow down the relay so that it will not overrun the stopping point. A pair of diodes 178 and 179 in the circuit 100 stop feedback from the X-step circuit into the X-reset circuit.

Three single pole-single throw relays 180, 181 182 are provided in the circuit 100. The first relay 180 stops the reset circuit at a first right contact A1. The second relay 181 opens a main indexing line 190 during resetting to give smooth operation. Since the reset mechanism on the 25 position relays 152, 154 is fast forward, the relay 181 is provided to prevent the pen 56 from running across the paper when the relays 152, 154 are resetting. The third relay 182 turns the telephone dial 62 from a normally closed to a normally open switch position.

FIG. 7 shows a sample of writing on a greatly reduced scale, by a handicapped writer who used a pen to write on a piece of paper. Note the irregularity of characters and wavering of lines caused by tremors. FIG. 8 shows a similar sample of writing as produced by the use of the present invention. The same subject matter as shown in FIG. 7 was written with a free arm movement using the joy stick 25, and the resulting graphic copy was produced in the recorder 12. Note that the characters are improved in legibility and are more regular in form. The wavering effects of hand tremors have been substantially reduced.

It will be apparent from the foregoing that a writing machine assembly employing a joy stick operated by arm movements of a handicapped person to outline large characters can produce legible, small characters on copy paper in an X-Y graphic recorder.

Although a preferred embodiment of the invention has been disclosed, many modifications are possible. For example, the circuit may be simplified by providing a single 50-step switch and single step relay instead of two 25-step switches and two step relays to accomplish indexing in the X' direction. Moreover other solid state electronic devices may be used for the relays and/or the stepping switches, etc.

It should be understood that the foregoing relates to only a preferred embodiment of the invention, and that it is intended to cover all changes and modifications of the example of the invention herein chosen for the purposes of the disclosure, which do not constitute departures from the spirit and scope of the invention.

I claim:

1. A writing assembly comprising:

a support;

a gimbal means carried by said support having two gimbal sets rotatable respectively on mutually perpendicular horizontal axes, an axially vertical joy stick pivotally carried by said gimbal means and having its lower end movable in all directions in a horizontal plane to outline a character;

a bias means connecting said joy stick to said gimbal means so that said joy stick is axially movable;

a first index switch means carried by said gimbal means and operable by said joy stick when the same is lifted axially;

a signal pickup means operatively connected to said gimbal sets, and carried by said support so that signals are produced as said joy stick is moved;

a recorder having a recording pen movable in all directions on a table for writing characters thereon; said recorder having an electromechanical drive means for moving said pen; and having input terminal means for applying a signal to said electromechanical drive means;

a first step switch means connected to said first index switch means so that said first step switch means moves one step each time said first index switch is closed; and a first voltage divider means connected in circuit with said first step switch means and said input terminal means of said recorder for applying said signals thereto, so that said pen is indexed one space at a time along a line of writing on said table each time said first index switch means is closed by the lifting of said joy stick.

2. A writing machine assembly as defined in claim 1 further comprising:

a first reset switch means connected in circuit with said first step switch means for resetting the same to a starting position and thereby resetting said pen to the beginning of a line of writing on said table.

3. A writing machine assembly as defined in claim 2 further comprising a multi-contact dial switch connected in parallel with said first index switch means for stepping said first step switch means any selected number of times each time said dial switch is operated, whereby said pen is advanced a corresponding number of spaces along said lines of writing on said table.

4. A writing machine assembly as defined in claim 3 further comprising:

a second index switch means carried by said support;

a second step switch means connected to said second index switch means so that said second step switch means moves one step at a time each time said second index switch means is closed; and a second voltage divider means connected in circuit with said second step switch means and said input terminal means of said recorder for applying signals thereto, so that said pen is indexed one line at a time in a direction perpendicular to said line of writing on said table.

5. A writing machine assembly as defined in claim 4 further comprising a second reset switch means connected in circuit with said second step switch means for resetting the same to said starting position and thereby resetting said pen to a first line of writing on said table.

6. A writing machine assembly as defined in claim 5 further comprising:

pen lift control means in said recorder responsive to said signal for lifting said pen from said table to stop writing thereon; and for lowering said pen to said table to write thereon;

an electrically conductive plate disposed under said joy stick, said joy stick being made of electrically conductive material; and electrical conductors connecting said plate and said joy stick to said pen lift control means so that said pen is lowered to said table when the free end of said joy stick is lowered to contact said plate, and said pen is lifted when said joy stick is raised from said plate.

7. A writing machine assembly as defined in claim 1 further comprising:

a second voltage divider means connected in circuit with said second step switch means and said input terminal means of said recorder for applying signals thereto, so that said pen is indexed one line at a time in a direction perpendicular to said line of writing on said table.

* * * * *